Patented Feb. 20, 1951

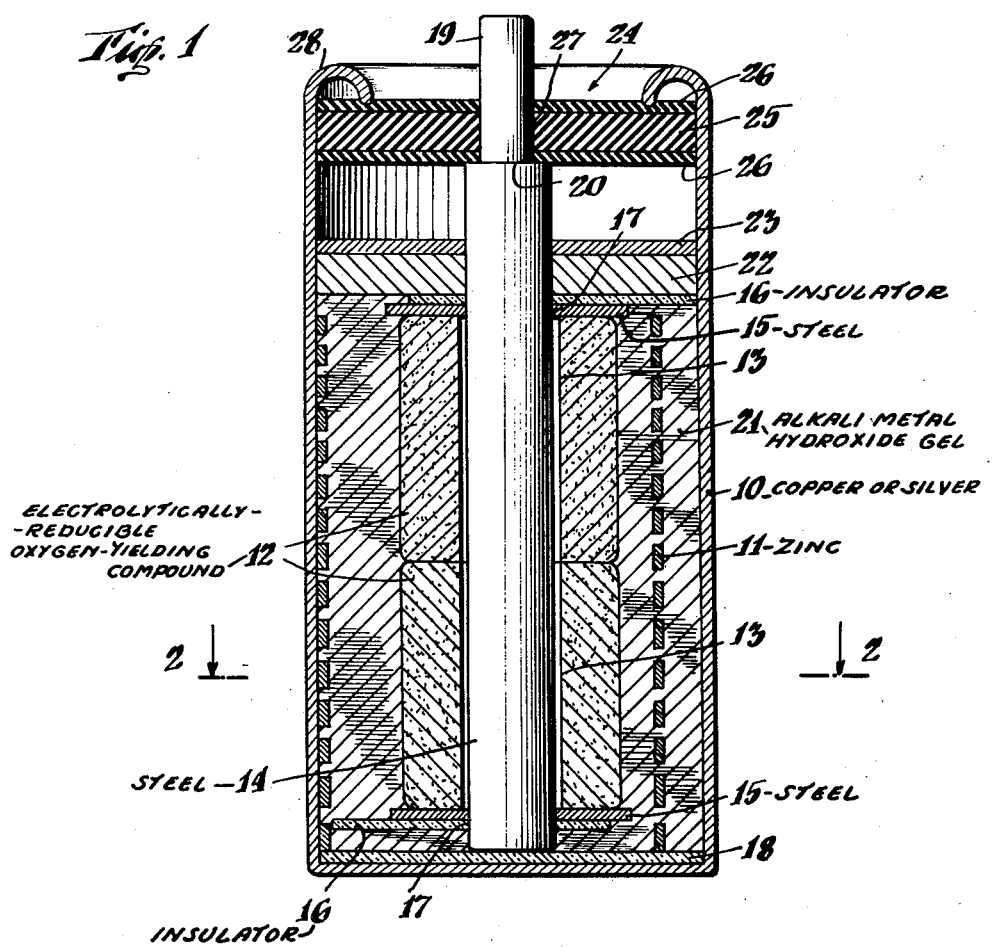
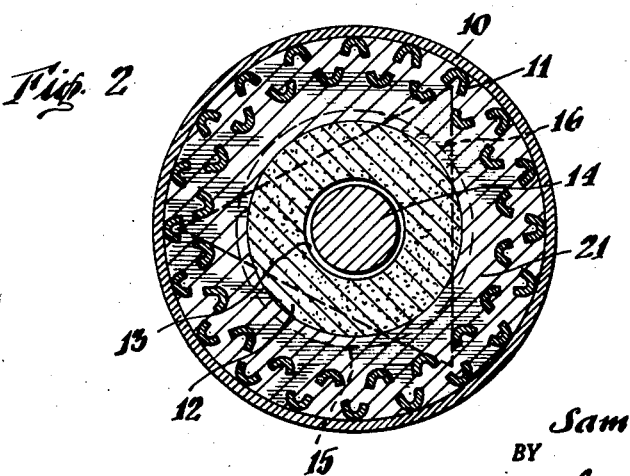

2,542,576

UNITED STATES PATENT OFFICE 2,542,576

ALKALINE CYLINDRICAL DRY CELL

Samuel Ruben, New Rochelle, N. Y.

Application October 15, 1947, Serial No. 779,874

14 Claims. (Cl. 136—107)

This invention relates to primary cells, and, more particularly, to a novel and improved electrode assembly for alkaline dry cells.

In my U. S. Patent 2,422,045, dated June 10, 1947, relating to an alkaline dry cell, there is disclosed a sealed alkaline primary cell having an amalgamated zinc anode, a cathode formed of a conductive body containing an electrolytically reducible oxygen-yielding compound (such as mercuric or silver oxide) and an immobilized electrolyte comprising an aqueous solution of an alkali metal hydroxide (such as potassium hydroxide) containing a substantial quantity of alkali metal zincate. The presence of the zincate in the electrolyte, in combination with other features described in the said patent, prevents or strongly inhibits any tendency for a chemical hydrogen-generating reaction to take place between the electrolyte and the zinc anode when the cell is stored prior to use as well as during active use. These factors have made possible a sealed alkaline dry cell which does not generate substantial gas or leak electrolyte during shelf life or when in use.

In my co-pending applications Serial No. 674,588, filed June 5, 1946, and Serial No. 682,734, filed July 11, 1946, I have disclosed alkaline dry cells of the general type described in my aforesaid patent and more particularly cylindrical cells of the so-called "penlight" type comprising an amalgamated zinc anode, a cathode-depolarizer body pressed on a rod of ferrous metal, and a body of alkaline electrolyte gel interposed between and in contact with the said anode and cathode. Preferably, the zinc anode is surrounded by and is in contact with a cell container formed of a metal inert to the electrolyte and having a low contact potential to zinc. The quantity of zinc in the anode is balanced with the depolarizing capacity of the cathode so that both anode and cathode are consumed substantially simultaneously. When such a cell combination is used with an alkaline electrolyte, it makes possible the provision of a sealed alkaline dry cell which is free of any tendency to electrolyte leakage or gas generation during shelf life, current generating life and at end of life. Such a cell can safely be used in any sort of equipment without hazard or damage due to electrolyte leakage or cell disintegration, even if the cell is allowed to remain in the equipment long after the end of its useful life.

The present application relates to a primary cell which constitutes an improvement over the cells disclosed and claimed in my aforesaid co-pending applications.

In prior alkaline cells of the cylindrical or penlight type, the cathode assembly generally comprised a rod of ferrous metal having pressed thereon a generally cylindrical coherent conductive body containing an electrolytically reducible oxygen-yielding compound (such as mercuric oxide), usually having finely divided inert material of higher conductivity (such as micronized graphite) intimately mixed therewith. While cathode assemblies of this type provided excellent results in alkaline dry cells of the described character, certain difficulties were experienced when manufacturing the cells on a quantity production scale. Frequently, cracks or fissures would develop in the pressed depolarizer body shortly after assembly of the cell. These cracks or fissures would frequently be accompanied with localized crumbling or breaking up of the cathode-depolarizer body and adversely influenced both the shelf as well as the useful life of the cell. Also, these changes in the shape and coherence of the cathode body had a detrimental influence on the electrical contact between the cathode body and its supporting or terminal rod.

After a careful experimental investigation of the outstanding problem, it was found that the foregoing difficulties were caused by expansion of the cathode body. Upon introduction of the cathode structure into the cell, electrolyte will be absorbed by the cathode causing expansion or swelling thereof. This expansion or swelling will cause a slight displacement or slipping of the cathode body on the supporting rod and will substantially increase the contact resistance therebetween. Moreover, since the supporting rod is non-compressible, the resulting stresses will be transferred to the exterior cylindrical surface of the cathode and will result in the production of cracks or fissures, generally extending in an axial direction.

I have discovered that the outstanding problem may be solved in a simple manner.

It is an object of the present invention to provide an electrode assembly for primary cells which eliminates the difficulties and inconveniences experienced in connection with prior electrode structures.

It is another object of the invention to provide a novel and improved cathode assembly for primary cells, specifically for alkaline dry cells having a cylindrical construction.

The invention also contemplates a sealed alkaline primary cell comprising a cathode assembly in which the expansion or swelling of the cathode body is compensated for and the occurrence of cracks and fissures in the compressed cathode body is positively prevented.

Other and further objects and advantages of the present invention will become apparent from the following description, taken in conjunction with the accompanying drawing, in which Fig. 1 is a longitudinal section through an alkaline dry cell embodying features of the present invention; and Fig. 2 is a transverse section taken on line 2—2 of Fig. 1.

Broadly stated, according to the principles of the invention, the cathode is provided in the form of one or more generally cylindrical pressed coherent bodies containing an electrolytically reducible oxygen-yielding compound which is preferably intimately mixed with a finely divided inert material of higher conductivity. An axial channel is provided in each of the cathode bodies through which a supporting rod of an inert metal, such as a suitable ferrous metal, may extend in a loosely fitting relation. This relation is assured by making the diameter of the supporting rod smaller than that of the channel in said bodies. Electrical and mechanical connection between the cathode rod and the cathode body or bodies is provided by means of apertured metal end caps or washers of which one is force-fitted on each terminal region of the rod so as to assure pressure contact with the respectvie end faces of the cathode bodies and to maintain the said boies under compression at all times. In this manner, a good electrical contact is permanently assured between the cathode bodies and the supporting rod, the said contact of low electrical resistance being improved rather than adversely affected by expansion or swelling of the cathode bodies. Also, since the diameter of the channels in the cathode bodies is greater than that of the supporting rod, expansion or swelling of the said bodies upon absorption of the electrolyte will not result in cracks or fissures and the cathode bodies will retain their initial shape throughout the useful life of the cell.

Referring now more particularly to the drawing, reference numeral 10 denotes a cylindrical container formed of a metal inert to the electrolyte and having a low contact potential with respect to zinc, when amalgamated, such as copper or silver, or alloys thereof with other metals, the preferred material being commercial bronze, which is an alloy of 90% copper and 10% zinc. Container 10 is closed at one end and is amalgamated on its inner surface. Within container 10 there is provided a corrugated and perforated zinc anode 11 of the type disclosed in my aforesaid co-pending application Serial No. 682,734, which is likewise amalgamated. In place of corrugations, it is possible to deform the anode in other ways, such as by embossing, in order to provide an adequate area. It will be noted that anode 11 has a substantially greater surface area than container 10 and is in electrical contact with the inner surface of the container, the said contact being assured and improved by an amalgam bond between container and anode.

The cathode assembly comprises a pair of cylindrical pressed coherent bodies 12 formed of an electrolytically reducible oxygen-yielding compound (for example, mercuric oxide) which may have a smaller quantity of finely divided inert material of higher conductivity, (for example graphite), admixed thereto. It is also possible, of course, to employ a single cylindrical cathode body of twice the length, rather than an assembly of two. Whether the cathode is made of one or several pieces depends upon the convenience of manufacture and is principally determined by the dimensions of the cell. An axial channel 13 of circular cross section is provided in cathode bodies 12 through which extends a supporting rod 14 of similar cross section formed of a metal inert to the electrolyte and to the cathode materials. This may be a suitable ferrous metal, such as steel, and when silver oxide is employed as the depolarizer, the rod is silver plated. The diameter of rod 14 is preferably smaller than that of channel 13 in the cathode bodies. A pair of apertured end caps or washers 15 are force-fitted on rod 14 at the ends thereof in such a position as to be pressed against the respective end faces of the cathode bodies and to maintain the said bodies under compression. As has been set forth in the foregoing, this form of construction permanently assures a good electrical contact of low resistance between the cathode bodies and their supporting rod. Also, as the result of the larger diameter of channels 13 as compared to that of rod 14, space is provided to take up expansion of the cathode bodies also in the radial direction, whereby cracking of said bodies and the formation of fissures therein is positively prevented. End caps or washers 15 may be formed of the same metal as rod 14. Both the end caps and the supporting rod may be silver plated for better surface contact with the cathode bodies, if desired.

The coaxial position of rod 14 within container 10 is assured by a pair of mica spacers 16 of triangular shape, each having an opening 17 in the center thereof through which the said rod may pass. The top one of said triangular spacers is of such dimensions as to have its three points extend to the inner surface of can 10, while the dimensions of the bottom spacer may be slightly smaller to have its three points or terminal regions engage the inner surface of corrugated zinc anode 11. The lower end of rod 14 rests on a mica disc 18 provided at the bottom of container or can 10. The upper end of the said rod is provided with a portion 19 of smaller diameter constituting the cathode terminal of the cell. A shoulder 20 is arranged between the terminal and the body portion of rod 14.

The space between the cathode assembly and the container is filled out with a body 21 of immobilized electrolyte. This is composed of an aqueous solution of an alkali metal hydroxide, such as potassium hydroxide, which is converted into a gel by addition of a suitable gelling agent, such as sodium carboxy-methyl cellulose, or a cereal starch. Preferably, the gel electrolyte initially contains a substantial quantity of alkali metal zincate, such as potassium zincate, sufficient to reduce the open circuit reactivity to a negligible value. However, the invention also contemplates electrolytes which are initially free of alkali metal zincate. The composition and the preparation of the eelctrolyte will be described more fully hereinafter in connection with the assembly of the cell of the invention.

Before assembling the cell, the brass can 10 and the zinc anode member 11 are separately amalgamated, for example by bringing them in surface contact with an acidified 3% mercuric nitrate solution at 55° C. for five minutes. After amalgamation, the can and anode member are washed and dried. The can is amalgamated on the inside only, the amalgamating solution being poured into the can.

In assembling the cell, mica disc 18 is first placed in the bottom of the can 10 and corrugated zinc anode member 11, bent into a cylinder, is forced into position over the disc, the corrugations pressing against the inside amalgamated wall of the brass can.

Electrolyte 21 comprises an aqueous alkaline solution immobilized as a gel. The preferred electrolyte is formed of:

| | | |
|---|---|---|
| C. P. potassium hydroxide (88% KOH) | grams | 100 |
| Zinc oxide | do | 16 |
| Water | ml | 100 |

This electrolyte is immobilized with 5 grams of sodium carboxy-methyl cellulose per 100 millilitres of the alkali zincate solution. In making the electrolyte the potassium hydroxide is added to 25 millilitres of water and the zinc oxide added. This mixture is stirred and heated to 180–190° C. and then allowed to cool to 110° C., after which 25 ml. of water is added, a clear solution being obtained. The sodium carboxy-methyl cellulose is crushed and screened through a 40 mesh screen and is added slowly to the solution, with constant stirring to form an emulsion or paste type substance. This is forced by extrusion from a tube into the cell which is heated to at least 100° C. and preferably to a temperature of about 120° C. At this temperature a clear fluid is obtained which upon cooling is converted into a tough, adherent, water-clear gel of low electrical resistance. When the electrolyte in the cell is at 120° C., the cathode assembly comprising supporting rod 14, cathode bodies 12 and end caps 15 is pushed in. The electrolyte rises around the said assembly and upon cooling congeals to an adherent gel surface. The gel fills all free spaces between the cathode assembly and the can and covers both sides of anode member 11.

After the electrolyte gel is solidified by cooling to room temperature, a layer 22 of heated petroleum jelly, mixed with about 50% of a hydrocarbon polymer known in the trade as Vistinex for better adhesion, is poured on top of the surface of electrolyte gel body 21, in order to seal it from the atmosphere. An oil-impregnated absorbent paper disc 23 is placed on top of the layer of the adhesive petroleum jelly. To effect an air-tight seal of the cell a laminated disc or coverplate 24 is provided, composed of an insulative disc 25 about 3/32" thick which is coated on both faces thereof with a layer 26 of a synthetic elastomer known in the trade under the name neoprene, having a thickness of about 1/64". Disc 25 has a central aperture 27 therein through which extends the upper end 19 of steel rod 14, having a reduced cross section. Thereafter, the upper edges of container 10 are crimped down upon disc 25, as shown at 28. This will press the center portion of disc 25 against shoulder 20 of steel rod 14 so that a complete and air-tight seal is obtained.

If during operation of the cell gas is generated, the increase in internal pressure will cause slight upward bulging of the coated disc 25 which allows some venting to occur in the region between shoulder 20 of rod 14 and the bottom surface of disc 25. Thus, the cell is protected from the development of excessive internal pressures in a simple, inexpensive and highly efficient manner.

While sodium carboxy-methyl cellulose is the preferred gel-forming agent, other materials may be used with equal or similar results. The invention also contemplates an electrolyte prepared in accordance with the procedure described in the foregoing but without the incorporation of a gel-forming agent. In that case the electrolyte is utilized in the liquid form and is immobilized by suitable absorbent spacer materials, such as Dexter paper or filter paper, interposed between cathode cylinders 12 and anode 11.

The physical dimensions of the cell are, of course, determined in accordance with the capacity desired for a particular application. Thus, in a practical cell embodying the invention, the can or container 10 had an outer diameter of 0.530", a height of 1 7/8", and was formed of commercial bronze 8 mil thick. The anode member was 1 1/2 inches square and was made by perforating a 15 mil zinc sheet with 325 holes of 33 mils diameter per square inch, and corrugating the sheet with 11 corrugations per inch to an overall thickness of 25 mils. Cathode supporting rod 14 was formed of steel and had a diameter of 0.125" and an overall length of 1.910" with a portion of reduced cross section 19 having a diameter of 0.098" and a length of 0.140". Cathode cylinders 12 had inner and outer diameters of 0.127" and 0.325", respectively, and were 0.750" long each. They were formed of an intimate mixture of about 90% mercuric oxide and of about 10% micronized graphite compressed under a pressure of about 30,000 pounds per square inch. End caps 15 were in the form of steel washers having an outer diameter of 0.320", an inner diameter of 0.123" and a thickness of 0.020". The quantity of the electrolyte, having the composition described in the foregoing, was approximately 3 cubic centimeters, although this will vary somewhat with the desired cell capacity. The open circuit voltage of this cell was 1.35 volts and its capacity approximately 2500 milliampere-hours.

The electrolyte gel disclosed in the foregoing has a substantial quantity of zinc oxide dissolved therein. By reaction with the alkali metal hydroxide electrolyte the zinc oxide is converted into an alkali metal zincate which is instrumental in reducing the open circuit reactivity in the cell to a negligible value. This is essential in order to assure a long shelf life for the cell at high storage temperatures and is critically important in cells which are stored and used in the tropics.

It is possible, however, to provide satisfactory sealed alkaline dry cells comprising an electrolyte of substantially solid consistency formed of an aqueous solution of an alkali metal hydroxide in the absence of zinc oxide, the said solution being immobilized by the addition of a small amount of sodium carboxy-methyl cellulose, or processed starch. Such electrolytes may be used with the cell structures illustrated in this application as well as in cells including the electrode structures disclosed in my Patent No. 2,422,045, or in any one of my aforesaid co-pending applications. In cells employing an electrolyte of solid consistency (that is a gel electrolyte, or a solid crystalline electrolyte, such as is disclosed in my co-pending application Serial No. 468,386, filed December 9, 1942, now Patent No. 2,463,565, dated March 8, 1949) in the preparation of which no zinc oxide is used, a saturated $Zn(OH)_2$ content is built up in the boundary layer of the solid electrolyte and anode, and this tends to limit internal reaction on shelf and cell gassing.

Cells of the described character, in which the addition of zinc oxide to the electrolyte of substantially solid consistency was dispensed with, are characterized by a reduced internal resistance and an increased flash current, this being particularly accentuated when the cells are operated at very low temperatures. Thus, in comparative tests, alkaline cells made with an electrolyte containing zinc oxide (100 parts by weight KOH, 16 parts ZnO and 100 parts H₂O, with a small addition of sodium carboxy-methyl cellulose) gave an average flash current of 1.0 ampere at —30° C., while Ruben cells of identical construction but containing no zinc oxide in the electrolyte (100 parts by weight of KOH and 100 parts of H₂O, with a small addition of sodium carboxy-methyl cellulose) gave an average flash current of 2.0 amperes at the same low temperature. In other words, the omission of zinc oxide in electrolytes of generally solid consistency resulted in an increase of 100% in flash current at low operating temperatures.

As to this feature of the invention, the present application is a continuation-in-part of my aforesaid co-pending application Serial No. 468,386, now Patent #2,463,565.

Although the present invention has been disclosed in connection with a few preferred embodiments thereof, variations and modifications may be resorted to by those skilled in the art without departing from the principles of the invention. I consider all of these variations and modifications to be within the true spirit and scope of the present invention, as disclosed in the foregoing description and defined by the appended claims.

What is claimed is:

1. A sealed alkaline primary cell comprising, in combination, at least one generally cylindrical coherent conductive cathode body containing an electrolytically reducible oxygen-yielding compound and having an axial channel therethrough, a terminal rod of ferrous metal extending through said channel and having a diameter which is smaller than that of the channel, the inner surface of said channel defining an expansion space with said rod for free radial expansion of said cathode body, an apertured metal contact plate force-fitted on each end of said rod in pressure engagement with the corresponding end face of said cathode body thereby holding the said body under axial compression but radially spaced from the rod, an amalgamated zinc anode surrounding said cathode, an immobilized body of an alkaline electrolyte interposed between and in contact with said cathode and anode, and a container of a metal selected from the group of copper and silver for said cell surrounding and in contact with said anode, the quantity of zinc being balanced with the depolarizing capacity of the cathode so that both anode and cathode are consumed substantially simultaneously.

2. A sealed alkaline primary cell comprising, in combination, at least one generally cylindrical coherent cathode body having an axial channel therethrough and containing an electrolytically reducible oxygen-yielding compound intimately mixed with finely divided conducting material, a metal supporting rod extending through said channel and having a diameter smaller than that of the channel, the inner surface of said channel defining an expansion space with said rod for free radial expansion of said cathode body, an apertured metal contact plate force-fitted on each end of said rod constructed and arranged to hold the said cathode body under compression therebetween, an amalgamated zinc anode surrounding said cathode, a body of alkaline electrolyte gel interposed between and in contact with said cathode and anode, and a cell container of inert metal of low potential to zinc surrounding said zinc anode and in contact therewith.

3. A sealed alkaline primary cell comprising, in combination, at least one cylindrical cathode-depolarizer body having an axial recess extending throughout the length thereof and being composed of compressed particles of an electrolytically reducible oxygen-yielding compound intimately mixed with similar particles of inert material of higher conductivity, said body being of such character as to expand when absorbing an electrolyte, a supporting rod of ferrous metal extending through the recess of said body having a diameter smaller than that of said recess, the inner surface of said recess defining an expansion space with said rod for free radial expansion of said cathode-depolarizer body, an apertured end cap of ferrous metal fixed on each end of said rod in such position as to be in pressure contact with the end faces of said cathode-depolarizer body whereby said body will be maintained under compression and in electrical conducting relation with said rod unaffected by expansion of said body, an amalgamated zinc anode surrounding said cathode-depolarizer, a body of electrolyte gel formed of an aqueous solution of potassium hydroxide containing a substantial proportion of potassium zincate and being immobilized with sodium carboxy-methyl cellulose interposed between and in contact with said cathode and anode, and a cell container of inert metal of low potential to zinc surrounding said zinc anode and in contact therewith.

4. A cathode subassembly for electrical current producing cells comprising, in combination, a cathode terminal rod, a cathode formed of a coherent conductive body containing an electrolytically reducible oxygen-yielding compound which will expand upon the absorption of an electrolyte and having an opening therein through which the said terminal rod extends, said opening having a diameter larger than that of said rod by an amount greater than the maximum radial expansion of said body thereby providing an interspace for accommodating such radial expansion, and an apertured contact member fixed on each end region of said rod holding the said cathode body under compression therebetween and in electrical conducting relation with the rod.

5. A cathode subassembly for primary cells comprising, in combination, a cathode terminal rod, a cathode constituted by an elongated coherent conductive body containing an electrolytically reducible oxygen-yielding compound which will expand upon absorption of an electrolyte and having a generally axial channel therein through which said terminal rod extends, the inner diameter of said channel being larger than the outer diameter of said rod by an amount greater than the maximum radial expansion of said cathode body thereby providing an interspace for accommodating such radial expansion, and an apertured contact plate force-fitted on each end region of said rod holding the said cathode body under compression therebetween and in electrical conducting relation with the rod.

6. A cathode-depolarizer element for primary cells comprising, in combination, at least one generally cylindrical coherent conductive body containing an electrically reducible oxygen-yielding compound which will expand upon absorption of an electrolyte and having an axial channel therethrough, a metal supporting rod extending through said channel and having a diameter which is smaller than that of the channel by an amount greater than the maximum radial expansion of said conductive body thereby providing an interspace for accommodating such radial expansion, and an apertured metal contact plate force-fitted on each end of said rod in pressure engagement with the corresponding end faces of said conductive body thereby holding the said body under compression and in permanent electrical conducting relation with the rod.

7. A cathode-depolarizer element for primary cells comprising, in combination, a plurality of generally cylindrical coherent bodies, each having an axial channel therethrough and containing an electrolytically reducible oxygen-yielding compound intimately mixed with finely divided conducting material which will expand upon absorption of an electrolyte, a metal supporting rod extending through the channel of each cylindrical body and having a diameter smaller than that of said channels by an amount greater than the maximum radial expansion of said bodies thereby providing an interspace for accommodating such radial expansion, and an apertured metal contact plate force-fitted on each end of said rod constructed and arranged to hold said cylindrical bodies under compression therebetween and in permanent electrical conducting relation with each other and with the rod.

8. A cathode-depolarizer element for primary cells comprising, in combination, at least one cylindrical cathode-depolarizer body having an axial recess extending throughout the length thereof and being composed of compressed particles of an electrolytically reducible oxygen-yielding compound intimately mixed with similar particles of inert material of higher conductivity, said body being of such character as to expand when absorbing an electrolyte, a steel supporting rod extending through the recess of said body and having a diameter smaller than that of said recess by an amount greater than the maximum radial expansion of said cathode-depolarizer body thereby providing an interspace for accommodating such radial expansion, and an apertured end cap of metal inert to said cathode-depolarizer and to said electrolyte fixed on each end of said rod in such position as to be in pressure contact with the end faces of said cathode-depolarizer body whereby said body will be maintained under compression and in permanent electrical conducting relation with said rod unaffected by expansion of said body and deterioration and cracking of said body during such expansion is positively prevented.

9. An electrical current producing cell comprising, in combination, a cathode terminal rod, a cathode formed of a coherent conductive body containing an electrolytically reducible oxygen-yielding compound which will expand upon absorption of an electrolyte and having an opening therein through which said rod extends, the diameter of said opening being larger than that of said rod by an amount greater than the maximum radial expansion of said cathode body thereby providing an interspace for accommodating such radial expansion, an apertured metal contact cap fixed on each end of said rod holding said body under compression on and electrically connected with said rod, an anode surrounding said cathode, and an electrolyte body interposed between and in contact with said cathode and anode.

10. An alkaline primary cell comprising, in combination, a cathode terminal rod, a cathode constituted by an elongated coherent conductive body containing an electrolytically reducible oxygen-yielding compound which will expand upon absorption of an electrolyte and having a generally axial channel therein through which said terminal rod extends, the diameter of said channel being larger than that of said rod by an amount greater than the maximum radial expansion of said cathode body thereby providing an interspace for accommodating such radial expansion, an apertured metal contact plate force-fitted on each end of said rod holding said cathode body under axial compression on and electrically connected with said rod but radially spaced from the rod, an amalgamated zinc anode surrounding said cathode, and an immobilized body of an alkaline electrolyte interposed between and in contact with said cathode and anode.

11. A primary cell comprising a container; an anode, an electrolyte, and a cathode-depolarizer in said container; said cathode-depolarizer comprising a metal rod, an apertured compressed body of depolarizer material having the property of swelling and expanding in said cell upon the absorption of electrolyte, said rod extending through the aperture of said body and having a diameter smaller than that of said aperture by an amount greater than the maximum radial expansion of said cathode-depolarizer body thereby providing an interspace for accommodating such radial expansion during cell life without cracking of the body, and an end contact member on each end of said rod in pressure contact with the corresponding ends of said cathode-depolarizer body throughout cell life.

12. In a primary cell of the class wherein an immobilized electrolyte cooperates with a zinc anode and with a cathode formed of a coherent conductive body containing an electrolytically reducible oxygen-yielding compound which will expand upon absorbing said electrolyte, the combination with said cathode body of a metal terminal rod extending through an opening in said body, the diameter of said opening being larger than that of said rod by an amount greater than the maximum radial expansion of said body thereby providing an interspace for accommodating such radial expansion, and an end contact cap fixed on each end of said rod holding said body under compression therebetween and in electrical conducting relation with the rod.

13. In a primary cell of the class wherein an immobilized alkaline electrolyte cooperates with an amalgamated zinc anode and with a cathode formed of a coherent conductive body containing an electrolytically reducible oxygen-yielding compound which will expand when absorbing said electrolyte, the combination with said cathode body of a supporting rod extending through a generally axial channel in said body, the diameter of said rod being smaller than that of said channel by an amount greater than the maximum radial expansion of said body thereby providing an interspace for accommodating such radial expansion, and a pair of end contact caps force-fitted on the respective terminal regions of said supporting rod and holding said body under compression therebetween and in electrical conducting relation with the rod, said conducting relation being preserved regardless of the expansion of said cathode body.

14. In a sealed alkaline primary cell which comprises an amalgamated zinc anode, a cathode formed of a generally cylindrical coherent conductive body containing an electrolytically reducible oxygen-yielding compound intimately mixed with finely divided inert material of higher conductivity which will expand upon the absorption of electrolyte, a body of alkaline electrolyte gel interposed between and in contact with said anode and cathode, and a substantially air-tight enclosure for the cell including a container in contact with the anode of a metal inert to the electrolyte and having a low contact potential with respect to zinc, the combination with said cathode body of a metal supporting rod extending through a generally axial channel in said body, the diameter of said rod being smaller than that of said channel by an amount greater than the maximum radial expansion of said body thereby providing an interspace for accommodating such radial expansion, and a pair of end contact caps force-fitted on the respective terminal regions of said supporting rod and holding said body under compression therebetween and in permanent electrical conducting relation with the rod whereby an electrical contact of low resistance is maintained between the cathode body and the said rod and deterioration and splitting of the said body is positively prevented when said body expands upon absorbing electrolyte.

SAMUEL RUBEN.

REFERENCES CITED

The following references are of record in the file of this patent:

UNITED STATES PATENTS

| Number | Name | Date |
|---|---|---|
| 720,592 | Kohn | Feb. 17, 1903 |
| 1,137,226 | Manchester | Apr. 27, 1915 |
| 1,340,222 | Graamans | May 18, 1920 |
| 1,637,446 | Hendry | Aug. 2, 1927 |
| 2,221,106 | Portail | Nov. 12, 1940 |
| 2,233,593 | Eddy et al. | Mar. 4, 1941 |
| 2,379,374 | Payne | June 26, 1945 |

FOREIGN PATENTS

| Number | Country | Date |
|---|---|---|
| 195,580 | Great Britain | Oct. 12, 1923 |